United States Patent
Kitabayashi et al.

(10) Patent No.: US 7,409,122 B2
(45) Date of Patent: Aug. 5, 2008

(54) END FACE STRUCTURE OF OPTICAL FIBER, OPTICAL FIBER LASER, AND LASER PROCESSING APPARATUS

(75) Inventors: Tomoharu Kitabayashi, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 156 days.

(21) Appl. No.: 11/103,468

(22) Filed: Apr. 12, 2005

(65) Prior Publication Data

US 2005/0244101 A1  Nov. 3, 2005

(30) Foreign Application Priority Data

Apr. 15, 2004  (JP) ............................. 2004-120006

(51) Int. Cl.
*G02B 6/32* (2006.01)

(52) U.S. Cl. .............................. 385/34; 385/27; 385/31; 385/32; 385/33; 385/39; 385/123; 385/124; 385/127; 385/128; 372/6; 372/13; 372/39; 372/92; 372/101

(58) Field of Classification Search .................... 385/27, 385/31, 33, 35, 39; 372/6, 13, 39, 92, 101
See application file for complete search history.

(56) References Cited

U.S. PATENT DOCUMENTS

| 5,263,103 | A | * | 11/1993 | Kosinski | 385/31 |
| 5,317,447 | A | * | 5/1994 | Baird et al. | 359/328 |
| 6,418,252 | B1 | * | 7/2002 | Maitland | 385/31 |
| 6,424,765 | B1 | * | 7/2002 | Harker | 385/31 |
| 6,485,199 | B1 | * | 11/2002 | Ware et al. | 385/99 |
| 2002/0168139 | A1 | * | 11/2002 | Clarkson et al. | 385/27 |
| 2006/0250658 | A1 | * | 11/2006 | Jurgensen | 358/3.29 |

FOREIGN PATENT DOCUMENTS

| JP | 7-225325 A | 8/1995 |
| JP | 7-281054 A | 10/1995 |
| JP | 2002-040271 A | 2/2002 |

* cited by examiner

*Primary Examiner*—Brian Healy
*Assistant Examiner*—Hung Lam
(74) *Attorney, Agent, or Firm*—Sughrue Mion, PLLC (57) ABSTRACT

An end face structure of an optical fiber includes a coreless fiber fused to an emitting end face of the fiber optical fiber and a coating material disposed around at least the coreless fiber, a refractive index of the coating material being higher than a refractive index of the coreless fiber.

37 Claims, 5 Drawing Sheets

END FACE STRUCTURE OF OPTICAL FIBER, OPTICAL FIBER LASER, AND LASER PROCESSING APPARATUS

BACKGROUND OF THE INVENTION

1. Field of the Invention

The present invention relates to an end face structure of an optical fiber that emits laser light, to an optical fiber laser including such an end face structure, and to a laser processing apparatus including such an optical fiber laser.

Priority is claimed from Japanese Patent Application No. 2004-120006, filed Apr. 15, 2004, which is incorporated herein by reference.

2. Description of Related Art

In recent years, lasers have been employed in various fields, including material processing apparatuses, medical treatment appliances, and measuring instruments. Especially in the field of material processing apparatus, laser light has been widely used because high-precision machining is made possible with laser light having a very small beam spot and a high power density since laser light exhibits excellent focusing property, because non-contact processing with little damage to a workpiece is possible, and because processing of hard materials that absorb laser light is possible. Specifically, laser light is used for welding, cutting, laser marking, high-precision processing, or the like.

$CO_2$ lasers using carbon dioxide gas as a lasing medium, solid-state lasers using a Nd:YAG crystal as a lasing medium, lasers that are obtained by converting wavelength of the laser light of solid-state lasers using a nonlinear optical crystal, or the like, have been conventionally used as lasers for processing according to particular applications.

On the other hand, optical fiber lasers that employ, as a lasing medium, optical fibers in which silica glass, which is doped with at least one rare earth element (or ions), such as Er, Nd, Yb, Ho, Tm, or the like, is used as a host glass (hereinafter, referred to as "rare-earth doped optical fibers"), or optical fibers made of fluoride glass, are attracting attention. An optical fiber laser has the following advantages: it has high laser light generating efficiency; it is possible to reduce the size of a laser apparatus since an optical fiber that is used as a lasing medium has a large surface area and can be cooled by air; and the same material can be used for both a lasing medium and a laser light propagation medium. Accordingly, optical fiber laser is being used for material processing apparatuses medical treatment appliances, or the like.

In such fields, although a laser having high output power in which an average output on the order of kilowatts is used in some applications, optical fiber lasers having relatively low average output power of 100 W or less are used in the fields of laser marking, or the like.

Figure 1:
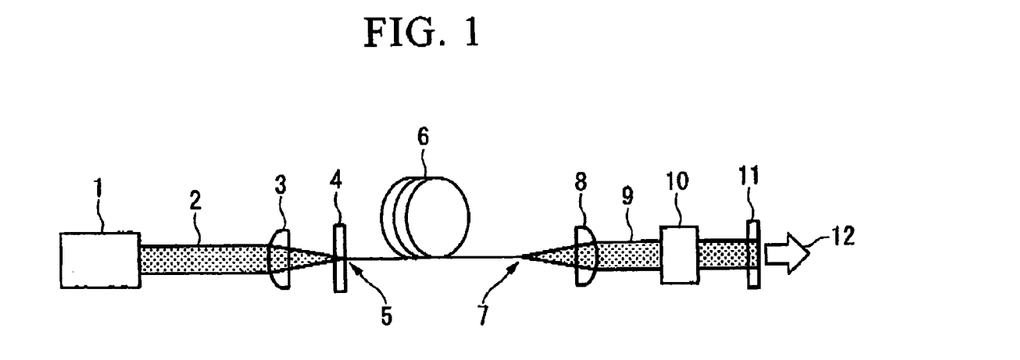
FIG. 1 is a schematic diagram illustrating a typical optical fiber laser.

FIG. 1 is a schematic diagram of a typical pulse fiber laser apparatus. This optical fiber laser generally includes a pumping part and a cavity part. The pumping part includes a pumping light source 1 and a condenser lens 3. Pumping light 2 output from the pumping light source 1 is focused on an incident end face 5 by the condenser lens 3, and is incident on a rare-earth doped optical fiber 6 that is a lasing medium. The cavity part includes a rare-earth doped optical fiber 6, a cavity mirror 4, an output coupler 11, a collimating lens 8, and a Q-switch 10. A dielectric multilayer film that selectively reflects laser light without reflecting the pumping light 2 is provided on the cavity mirror 4. Another dielectric multilayer film that reflects some of the laser light and transmits the other laser light is provided on the output coupler 11. The rare-earth doped optical fiber 6 is adjusted the length thereof so that the desired output characteristics are obtained, and the two ends of the rare-earth doped optical fiber 6 are optically polished. The pumping light 2 that is incident on the dearth doped optical fiber 6 is absorbed by the ions of the rare earth element or elements that have been doped into a core of the rare-earth doped optical fiber 6, and the ions of the rare earth element or elements that absorb the pumping light 2 emit light having a particular wavelength. The light emitted from the ions of the rare earth element or elements propagates through the rare-earth doped optical fiber 6 while being amplified, and is emitted from an emitting end face 7. The emission light 9 from the emitting end face 7 is collimated by the collimating lens 8, and is shaped into a desired pulse shape by the Q-switch 10. Some of the emission light 9 is reflected by the output coupler 11. The reflected emission light 9 is fed back to the rare-earth doped optical fiber 6, reflected by the cavity mirror 4, and emitted from the emitting end face 7. In this cycle, the reflected emission light 9 goes back and forth within the cavity. In one round-trip path, if amplification of the output light is larger than loss of the output light 9, laser light 12 is output from the output coupler 11. In addition, if the Q-switch 10 is not employed, such a light is output as a continuous laser.

Since the diameter of the core of the rare-earth doped optical fiber is generally in the range of several to tens of micrometers, the power density of the light propagating through the optical fiber core is significantly high. In a case in which the output power is 1 kW and the diameter of the core is 10 μm, for example, the power density of the light output from the core can be as high as about 1.3 $GW/cm^2$. With such a high power density, burn-in caused by adhered dust or contaminants may destroy the end face of the optical fiber, which may result in critical damage. Thus, the emitting end face 7 may be damaged in the fiber laser shown in FIG. 1, which is one of the leading factors inhibiting realization of a high output optical fiber laser.

One technique for preventing such a damage to end faces is known. In this technique, the power density is reduced, i.e., the spot diameter is enlarged at the emitting end face 7 (for example, Japanese Unexamined Patent Application, First Publication No. 2002-40271).

Figure 2:
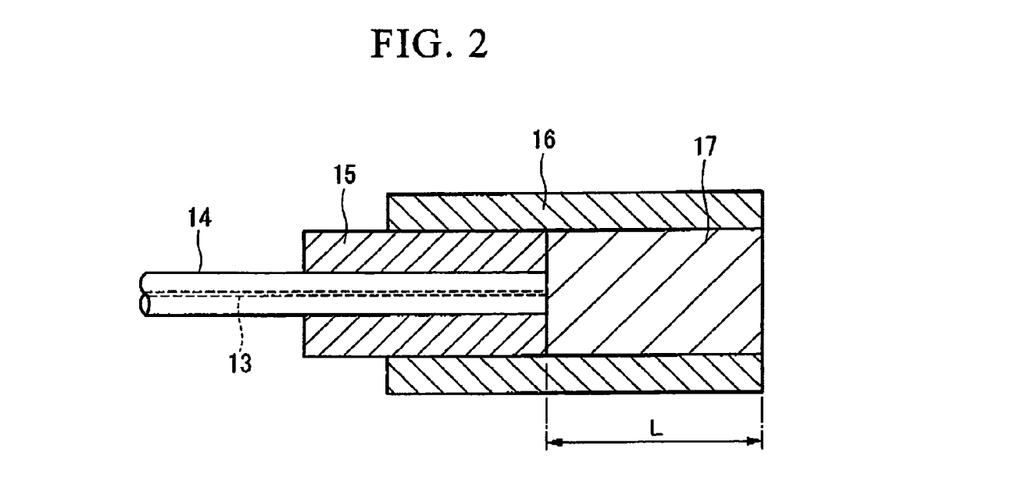
FIG. 2 is a cross-sectional view of an example of a conventional end face structure of an optical fiber.

FIG. 2 is a cross-sectional diagram illustrating such an end nice structure in detail. In this figure, an optical fiber 13 is secured in a ferrule 15 with an adhesive, and the end face of the optical fiber, including a core 14, is optically polished. The ferrule 15 in which the optical fiber 13 is secured is halfway inserted in a capillary 16, and the remaining hollowed portion of the capillary 16 is filled with an optical filler 17, for example, a ultraviolet light (UV) curing resin. In this structure, the light emitted from the optical fiber 13 propagates through the optical filler 17 with the spot diameter thereof being enlarged, and when the light reaches the end face of the optical filler 17, the spot diameter is increased so as to be larger than the diameter of the core. For example if the spot diameter at the end face of the optical filler 17 is twice as large as the diameter of the core, power density at the end face of the optical filler 17 is reduced to a quarter of the power density at the end face of optical fiber 13. Accordingly, burn-in can be prevented even when a high output power laser is employed, regardless of the type of laser, i.e., pulsed light, or continuous light.

In addition, in the case of a pulsed laser, a high peak power of the output pulse is desired, and to increase the peak power, it is essential that an end face of a rare-earth doped optical fiber be subjected to anti-reflection treatment of laser light. In a laser apparatus as shown in FIG. 1, for example, when pumping light is incident on the rare-earth doped optical fiber, rare earth ions doped into the core of the rarer-earth doped optical fiber are pumped, thereby inducing population inversion. If the emitting end face of the rare-earth doped optical fiber is not provided with the anti-reflection treatment, spontaneously emitted light emitted from the rare earth ions is reflected by the emitting end face, and such reflected light is amplified while propagating through the core. In some cases, laser oscillation may occur, which results in a decrease in the population inversion. In contrast, even in a case when an anti-reflection treatment is provided on the emitting end face, generation and amplification of spontaneously emitted light occurs, which, however, does not result in laser oscillation. Accordingly, high population inversion can be maintained. When the loss of the Q-switch is abruptly reduced, the light reflected from the output coupler propagates in the rare-earth doped optical fiber and laser oscillation drastically occurs. Thus, pulses having high peak power can be obtained. An anti-reflection treatment is typically applied by providing on the end face of the optical fiber a dielectric multilayer film that does not reflect laser light.

However, in a conventional end face structure of an optical fiber shown in FIG. 2, an optical filler that has the same refractive index as the optical fiber should be used in order to prevent reflection at the end face of the optical fiber. Accordingly, expensive filler are used since there are not many options for filler materials, which results in increased production cost.

In addition, when an ultraviolet curing resin is used, if the length L of the optical filler 17 shown in FIG. 2 is long, the curing resin is not completely cured since ultraviolet light does not reach the region far from the surface and air bubbles are present. It is difficult to form an optically complete continuous junction. Furthermore, the resin exhibits poor resistance to optical power, and the resin may be burned Furthermore, providing a dielectric multilayer film in the anti-reflection treatment requires vacuum processing, which is time-consuming and expensive.

SUMMARY OF THE INVENTION

The present invention was conceived in view of the above-mentioned background, and an object thereof is to provide a low-cost end face structure and optical fiber connection that prevents damage to end faces of optical fibers that output high power laser light, an optical fiber laser having such an end face structure, and a laser processing apparatus including such an optical fiber laser.

To achieve the above-mentioned object, the first aspect of the present invention provides an end fare structure of an optical fiber, including a coreless fiber fused to an emitting end face of the optical fiber, and a coating material disposed around the coreless fiber, a refractive index of the coating material being higher than a refractive index of the coreless fiber.

In the end face structure of an optical fiber according to the present invention, a length of the coreless fiber may be selected so that light that is emitted from the optical fiber and propagates within the coreless fiber is emitted from the coreless fiber without the light reaching a boundary between the coreless fiber and the coating material.

In the end face structure of an optical fiber according to the present invention, the optical fiber and the coreless fiber may be made of the same material.

In the end face structure of an optical fiber according to the present invention, the optical fiber and the coreless fiber may be one of a silica-based optical fiber and a fluoride-based optical fiber.

In the end face structure of an optical fiber according to the present invention, the coating material may be one of an ultraviolet curing resin and a thermal curing resin.

In the end face structure of an optical fiber according to the present invention, the coating material may have an optical attenuation factor of 50% or more at a wavelength of the emission light.

In the end face structure of an optical fiber according to the present invention, the optical fiber may be a rate-earth doped optical fiber.

In the end face structure of an optical fiber according to the present invention, the rare-earth doped optical fiber may have a double cladding structure.

In the end face structure of an optical fiber according to the present invention, an element doped into the rare-earth doped optical fiber may be at least one element selected from the group consisting of Er, Yb, Ho, Tm, and Nd. An exemplary ionic charge number of these ions existing in the optical fiber may be "3+"; that is the ions may be $Er^{3+}$, $Yb^{3+}$, $Ho^{3+}$, $Tm^{3+}$, and $Nd^{3+}$.

The present invention provides an optical fiber laser including the above-described end face structure of an optical fiber of the present invention.

The optical fiber laser according to the present invention may output pulsed light.

Furthermore, the present invention provides a laser processing apparatus including the above-described optical fiber laser of the present invention.

According to the end face structure of an optical fiber according to the present invention, pulses that are resistant to optical power and have a high peak power without requiring a special anti-reflection treatment on the end face of an optical fiber can be obtained by simply fusing the emission end face of an optical fiber to the coreless fiber by any conventionally known procedure, and disposing a coating material having a high refractive index around the optical fiber and, optionally, around the part of the coreless fiber adjacent to the optical fiber. An exemplary embodiment of the optical fiber is a rare-earth doped optical fiber that emits laser light.

DETAILED DESCRIPTION OF THE INVENTION

Hereafter, embodiments of the present invention will be described with reference to the drawings.

Figure 3:
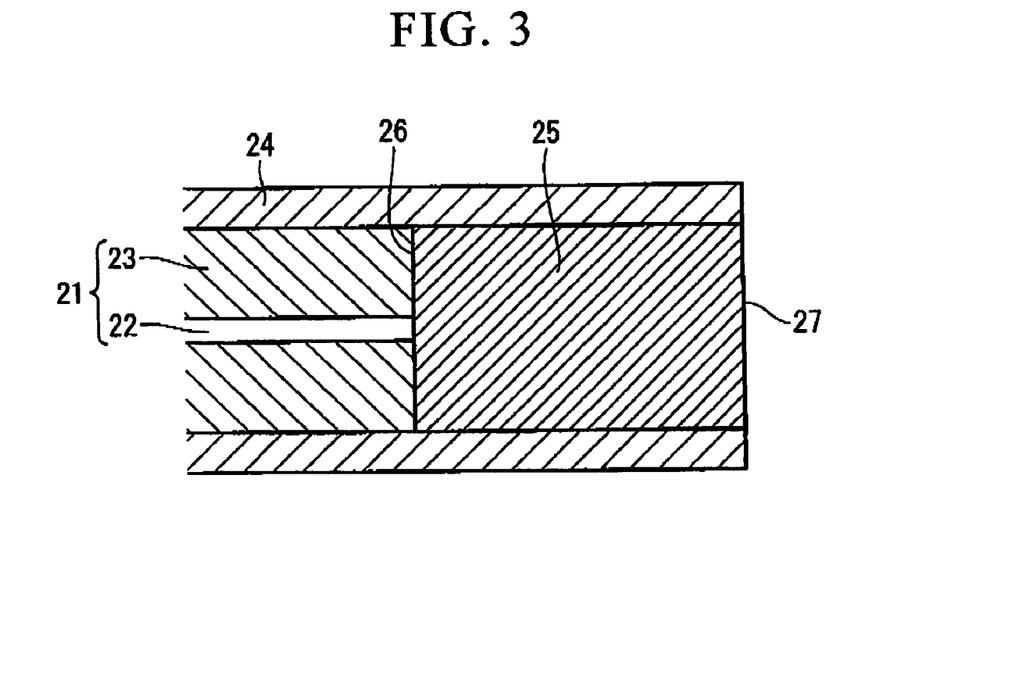
FIG. 3 is a cross-sectional view illustrating an embodiment of an end face structure of an optical fiber according to the present invention.
Figure 4:
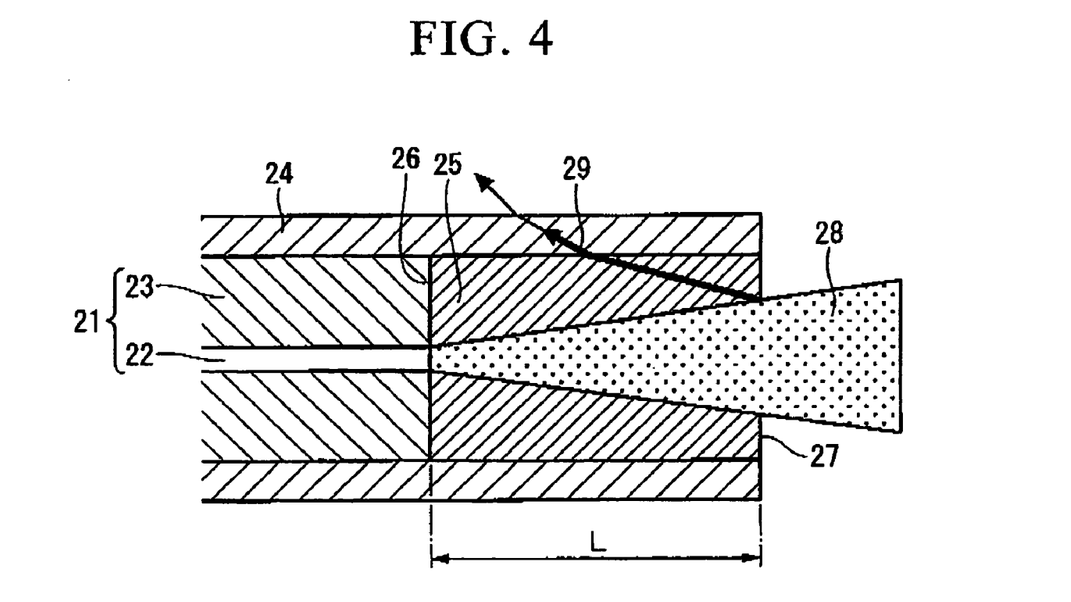
FIG. 4 is a cross-sectional view illustrating spreading optical axis in the end face structure of an optical fiber according to the present invention.
Figure 5:
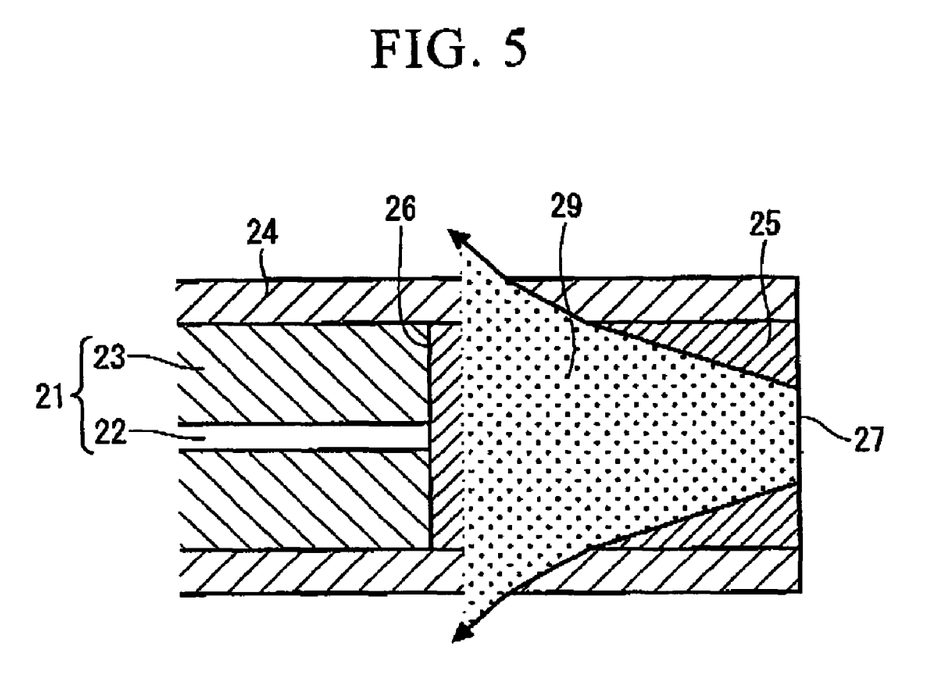
FIG. 5 is a cross-sectional view illustrating propagation paths of the light from the end face structure of an optical fiber according to the present invention.

FIGS. 3 to 5 are cross-sectional views illustrating an embodiment of an end face structure of an optical fiber according to the present invention. FIG. 3 is a cross-sectional view of the end face structure of the optical fiber, FIG. 4 is a cross-sectional view of the end face of the optical fiber and the paths of the light from the end face. FIG. 5 is a cross-sectional view illustrating the paths of the light reflected by an end face of the coreless fiber 25. In these figures, reference numerals 21 denotes a rare-earth doped optical fiber, reference numerals 22 denotes a core of the rare-earth doped optical fiber, reference numerals 23 denotes a cladding of rare-earth doped optical fiber, reference numerals 24 denotes a coating material, reference numerals 25 denotes a coreless fiber, reference numerals 26 denotes an end face of the rare-earth doped optical fiber, reference numerals 27 denotes an emitting end face of the coreless fiber, reference numerals 28 denotes laser light, and reference numerals 29 denotes reflected light In the end face structure of the optical fiber, the coreless fiber 25 is fused to the emitting end face 26 of the rare-earth doped optical fiber 21. The coating material 24 that has a higher refractive index than the refractive index of the coreless fiber 25 is provided around at least the coreless fiber 25. The length L of the coreless fiber 25 that is fused to the end face 26 of the rare-earth doped optical fiber is set to an appropriate value so that the laser light 28 emitted from the rare-earth doped optical fiber 21 never reaches the boundary between the coreless fiber 25 and the coating material 24 while propagating within the coreless fiber 25, as shown in FIG. 4. Furthermore, the rare-earth doped optical fiber 21 and the coreless fiber 25 are made of the same material. The element (ion) doped into the rare-earth doped optical fiber may be at least one element selected from the group consisting of Er, Yb, Ho, Tm, and Nd. An exemplary ionic charge number of these ions may be "3+"; that is the ions may be $Er^{3+}$, $Yb^{3+}$, $Ho^{3+}$, $Tm^{3+}$, and $Nd^{3+}$.

The host glass of the rare-earth doped optical fiber 21 may be fluoride glass, and the rare-earth doped optical fiber 21 includes the core 22 and the cladding 23 that is disposed in the outer periphery of the core 22. The laser light 28 is output from the end face 26 of the rare-earth doped optical fiber. The end face 26 of the rare-earth doped optical fiber is fused to the coreless fiber 25 that is made of the same material as the rare-earth doped optical fiber 21, and the emitting end face 27 of the coreless fiber 25 is optically polished. Since the rare-earth doped optical fiber 21 is fused to the coreless fiber 25 that is made of the same material as the rare-earth doped optical fiber 21, resistance to power is not compromised and air bubbles are not generated. The coating material 24 is provided both at the outer periphery of the coreless fiber 25 and the outer periphery of the rare-earth doped optical fiber 21 adjacent to the spliced portion.

The laser light 28 emitted from the end face 26 of the rare-earth doped optical fiber propagates within the coreless fiber 25, as shown in FIG. 4, while spreading with respect to the optical axis at an angle of NA/n (where NA represents the numerical aperture of the core 22 of the rare-earth doped optical fiber 21, and "n" represents the refractive index of the coreless fiber 25), and reaches the emitting end face 27 of the coreless fiber.

While most of the laser light that has reached the emitting end face 27 of the coreless fiber is emitted from the emitting end face 27, some is reflected as reflected light 29, as shown in FIG. 5, and propagates within the coreless fiber 25 while spreading further to reach the boundary between the coreless fiber 25 and the coating material 24.

If the refractive index of the coating material 24 is greater than the refractive index of the coreless fiber 25, the light that has reached the boundary exits to the coating material 24. In other words, most of the reflected light 29 exits to the coating material through the boundary, and a small portion of the light is incident back to the core 22 of the rare-earth doped optical fiber 21, and propagates within the core 22. The light that returns to the core 22 propagates while being amplified, which may result in a decrease in population inversion of the rare-earth doped optical fiber 21. The spot diameter of the reflected light 29 that is fed back to the end face 26 of the rare-earth doped optical fiber is $a^2/r^2$ times of the core diameter before emitting from the end face 26 where "a" is the core diameter of the rare-earth doped optical fiber 21 and "r" is the spot diameter of the emitting end face 27 of the coreless fiber. Thus, the amount of the light returning to the core 22 varies depending on the length L of the coreless fiber 25 since "r" is expressed by L·tan(NA/n). By properly selecting the length L of coreless fiber 25, the adverse effect on the population inversion can be eliminated, and no special anti-reflection treatment on the emitting end face is required.

It should be noted that if the refractive index of the coating material 24 is less than the refractive index of the coreless fiber 25, the reflection occurs at the boundary between the coreless fiber 25 and the coating material 24, and less light exits from the coating material. Thus, the ratio of the light returning to the core is greater Man $a^2/r^2$, which may further adversely affect the population inversion. This holds true in cases in which no coating serial 24 is provided (e.g., the coreless fiber 25 is exposed and surrounded by the air) or in which a typical optical fiber having a core and a cladding is used in place of the coreless fiber 25.

Furthermore, even when the refractive index of the coating material 24 is grater than the refractive index of the coreless fiber 25, if the refractive index of a material disposed around the coating material 24 is less than the refractive index of the coating material 24, reflection occurs at the boundary between the material and the coating material 24. In this case, the ratio of the light returning to the core 22 is increased as in the above-described case in which the refractive index of the coating material 24 is less than the refractive index of the coreless fiber 25. In order to avoid this situation, the coating material 24 preferably has a sufficient thickness to attenuate most of the reflected light 29. The coating material 24 may have an optical attenuation factor of 50% or more at a wavelength of the emission light. Also, the coating material 24 may be roughly polished so that the light that reaches the surface of the coating material 24 is sufficiently scattered.

In the above-described end face structure of an optical fiber, pulses that have a high peak power without requiring a special anti-reflection treatment that is resistant to optical power can be obtained by simply fusing one end face of the rare-earth doped optical fiber 21 to the coreless fiber 25, and disposing the coating material 24 having a high refractive index around the rare-earth doped optical fiber 21 and a part of the coreless fiber 25 adjacent to the rare-earth doped optical fiber 21.

The present invention also provides an optical fiber laser having the above-described end face structure of an optical fiber. The optical fiber laser according to the present invention can be constructed, for example, by providing the above-described end face structure of an optical fiber of the present invention to the emitting end face of a typical optical fiber laser, such as the one shown in FIG. 1.

The optical fiber laser according to the present invention may be any laser, including a continuous laser. However, the optical fiber laser of the present invention preferably outputs pulsed light for the reason of better processing performance or the like.

Figure 8:
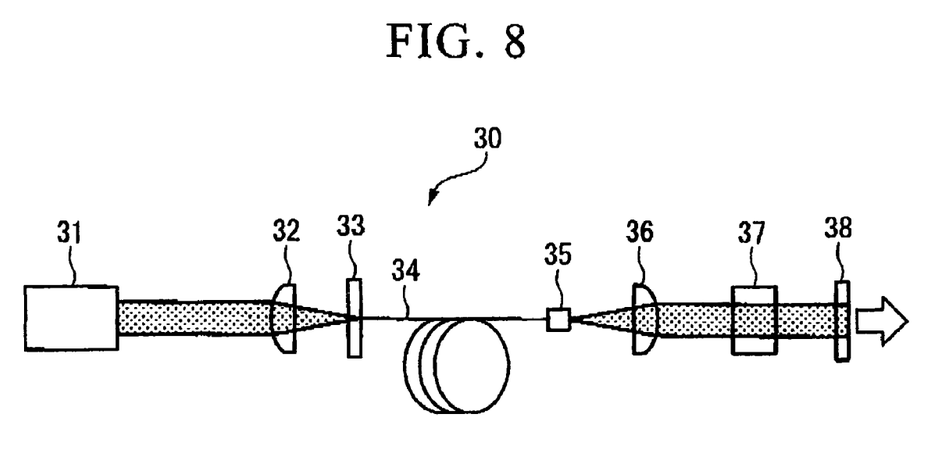
FIG. 8 is a schematic diagram illustrating an exemplary optical fiber laser according to the present invention.

The optical fiber laser according to the present invention will be explained with reference to FIG. 8. FIG. 8 is a schematic diagram of an exemplary optical fiber laser 30 according to the present invention. The optical fiber laser 30 may include a pumping light source (LD) module 31, a condenser lens 32, a rear mirror 33, an erbium-doped optical fiber (EDF) 34, a coreless fiber 35, a collimating lens 36, an acousto-optic (AO) device 37, and an output mirror 38.

The light output from the pumping LD module 31 is focused on the pumping light incident end face of the EDF 34 by the condenser lens 32. As the EDF, an EDF having a double cladding structure may be used, and such an optical fiber having a double cladding structure includes a first cladding and a second cladding. The first cladding functions as a core with respect to the second cladding, as well as functioning as a cladding with respect to the core. When a typical EDF having a single cladding structure is used, pumping light is required to be incident on the core. However, the small-diameter core only permits a small amount of the pumping light to be coupled to the core, resulting in substantial amount of loss. In contrast, an EDF having a double cladding structure allows more pumping light to be coupled since the pumping light can couple to a first cladding that has a relatively large diameter, as well as the core. Thus, the pumping light is focused on the first cladding on the pumping light incident end face of the EDF 34 by the condenser lens 32. When the pumping light incident on the first cladding traverses the cote while propagating through the first cladding, the pumping light is absorbed, for example, by Er ions that have been doped into the core. The Er ions that absorb the pumping light spontaneously emit light (i.e., spontaneous emission) that has a different wavelength than that of the pumping light, and a portion of the spontaneously emitted light that propagates through the core is amplified during propagation, and is emitted as amplified spontaneous emission (ASE).

Two cavity mirrors are provided to the two ends of the EDF 34. One is the output mirror 38 provided at the emission side of the laser, and although the output mirror 38 reflects a portion of the spontaneous emission having particular wavelengths, the reflectance is not 100% but is adjusted so that a desired output is obtained. The other is the rear mirror 33 which has the same reflection wavelength but has a reflectance of nearly 100% and does not affect the light at the pumping wavelength.

The AO device 37 is controlled so that the transmission thereof periodically cycles between a large transmission loss state and a small transmission loss state. When the transmission loss of the AO device changes between the large transmission loss state and the small transmission loss state, the ASE that is emitted from the EDF 34 is reflected back and forth by the rear mirror 33 and the output mirror 38 in the cavity and is amplified every time it passes the EDF 34, which causes oscillation. A part of the laser light passes through the output mirror 38, thereby generating a pulsed laser beam.

The laser output end face of the EDF is subjected to the same treatment as shown in FIG. 3.

Furthermore, the present invention provides a laser processing apparatus including the above-described optical fiber laser of the present invention. This laser processing apparatus includes the above-described optical fiber laser of the present invention, and optionally includes any other mechanisms that are used in a conventional laser processing apparatus, such as a driving mechanism, focusing mechanism, control apparatus, and the like, according to requirements.

EXAMPLES

The end face structure of the present invention was fabricated. An erbium-doped optical fiber was used as the rare-earth doped optical fiber. The erbium-doped optical fiber has a double cladding structure having first and second claddings, in which the diameter of the core was 40 μm, the diameter of the first cladding was 400 μm and the diameter of the second cladding was 530 μm. Furthermore, the second cladding was a polymer cladding, and the second cladding at the fuses-spliced portion was stripped by soaking it in an organic solvent. A coreless fiber having a diameter of 280 μm was used. The refractive index of the core of the erbium-doped optical fiber and the coreless fiber was 1.53.

Furthermore, an ultraviolet curing resin having a refractive index of 1.56 was used as the coating material. Although an ultraviolet curing resin was used in this example, the coating material is not limited to ultraviolet curing resins, and other resins, such as thermal curing resins may be used. A 980-nm laser diode was used as a pumping light source and an acousto-optic (AO) modulator was used as a Q-switch, and the laser was operated so that pulse with 600 Hz and a duty of 20% was obtained.

Figure 6:
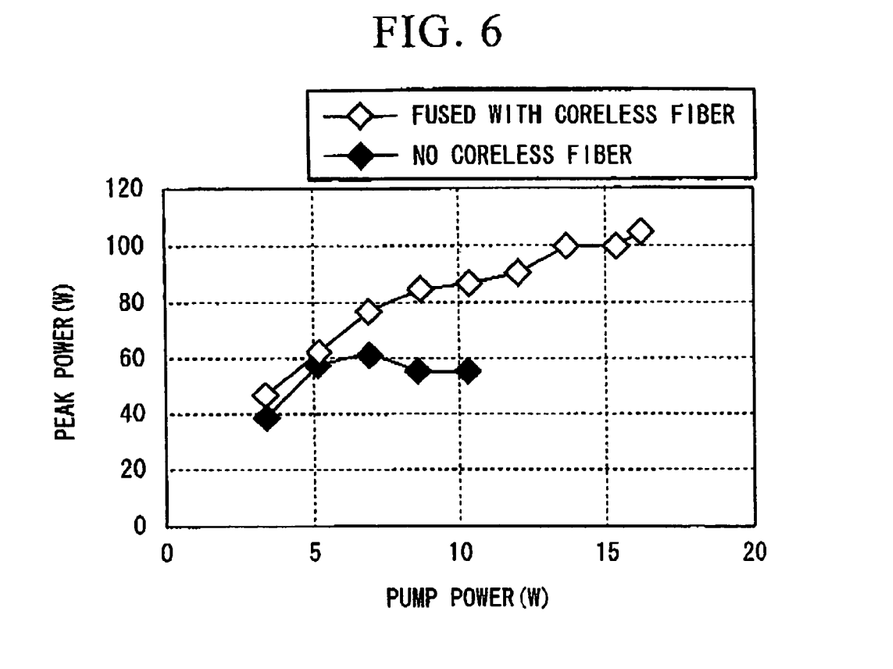
FIG. 6 is a graph comparing the results of laser output characteristics of an Example in which a coreless fiber was fused and a Comparative Example in which no coreless fiber was fused.

The laser light output characteristics of the laser were compared when a coreless fiber was fused (indicated by the label "FUSED WITH CORELESS FIBER" shown in FIG. 6) and when no coreless fiber was fined (indicated by the label "NO CORELESS FIBER" shown in FIG. 6). The results are shown in FIG. 6. In order to compare resistance to optical power, in the case in which no coreless fiber was fused, the emitting end face of the erbium-doped optical fiber was subjected to an anti-reflection treatment by providing a dielectric multilayer film.

As shown in FIG. 6, the output was saturated at a peak power of about 60 W when no coreless fiber was fused since the end face of the erbium-doped optical fiber was damaged. In contrast, when the coreless fiber was fused, the laser output was increased to a degree in which the pumping light power incident on the rare-earth doped optical fiber is increased. In addition, the end face of the erbium-doped optical fiber was not damaged when the peak power exceeded 100 W.

Figure 7:
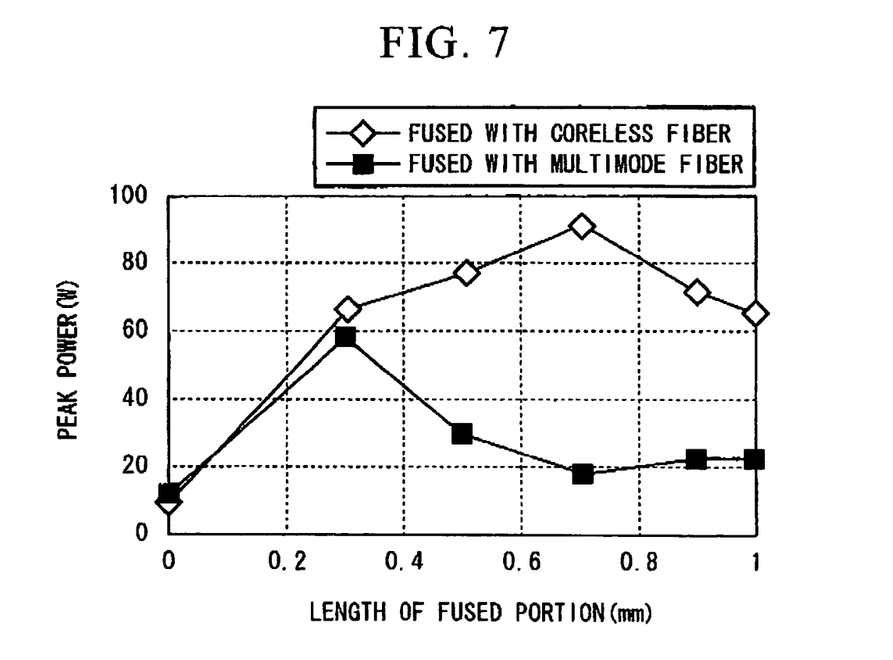
FIG. 7 is a graph showing the results of laser output characteristics of the Example when either a coreless fiber or a multimode fiber was fused while changing the length of the fused portion.

Furthermore, the end face structure of the present invention was fabricated by fusing either a coreless fiber (Example) or a multimode fiber (Comparative Example). Then, the output characteristics versus the length of the fused portion (the length L of the spliced coreless or multimode fiber) were determined. The results are shown in FIG. 7. A multimode fiber was used that was made of the same material as the material of the erbium-doped optical fiber, that had a core diameter of 300 μm, and that had a cladding diameter of 380 μm. In the legend of FIG. 7, the label "FUSED WITH CORELESS FIBER" indicates the results of the Example (when a coreless fiber was fused), and the label "FUSED WITH MULTIMODE FIBER" indicates the results of the Comparative Example (when the multimode fiber was filed). Zero length of the fused portion means that no fiber is fused.

In the case of the multimode fiber (indicated by "FUSED WITH MULTIMODE FIBER" in FIG. 7), when the spot diameter at the end face of the erbium-doped optical fiber of the light reflected from the emitting end face was smaller than the core diameter of the multimode fiber, the peak power increased with an increase in the length of the fused portion since less reflected light returned to the core. When the spot diameter at the end face of the erbium-doped optical fiber of the light reflected from the emitting end face exceeded the core diameter of the multimode fiber, the light reflected from the emitting end face was reflected at the interface between the core and the cladding and more reflected light returned to the core. Accordingly, the peak power decreased with an increase in the length of the fused portion. Furthermore, when the length of the fused portion was increased further and, accordingly, the spot diameter at the emitting end face became greater than the core diameter of the multimode fiber, the splicing efficiency of the laser light that is output from the emitting end face and is reflected by an output coupler to the core of the erbium-doped optical fiber was decreased, which resulted in a decrease in the peak power.

In the case of the multimode fiber ("FUSED WITH MULTIMODE FIBER" in FIG. 7) of Comparative Example, at the length of the fused portion of 430 μm, the spot diameter at the end face of the erbium-doped optical fiber of the reflected light from the emitting end face became equal to the core diameter of the multimode fiber. Thus, the peak power increased with an increase in the length of the fused portion when the length of the fused portion is 430 μm or smaller. When the length of the fused portion is 430 μm or greater, the peak power decreased with an increase in the length of the fused portion, which is fairly consistent with the results of experiments.

In contrast, in the case of the coreless fiber ("FUSED WITH CORELESS FIBER" in FIG. 7), the spot diameter at the end face of the erbium-doped optical fiber of the reflected light from the emitting end face became greater than the core diameter of the coreless fiber. Thus, no reflected light is reflected at the interface between the coreless fiber and the ultraviolet curing resin even when the reflected light reached the interface since the refractive index of the ultraviolet curing resin was greater than that of the coreless fiber. Accordingly, as the length of the fusion fiber increases, less of the light that is reflected from the emitting end face returns to the core of the erbium-doped optical fiber.

Furthermore, as in the case of the multimode fiber, the spot diameter at the emitting end face became greater than the diameter of the coreless fiber, the splicing efficiency of the laser light that is output from the emitting end face and is reflected by an output coupler to the core of the erbium-doped optical fiber was decreased, which resulted in a decrease in the peak power.

In a case of the coreless fiber used in this example, at the length of the fused portion of 800 μm, the spot diameter of the reflected light from the emitting end face became equal to the core diameter of the multimode fiber. Thus, the peak power increased with an increase in the length of the fused portion when the length of the fused portion is 800 μm or smaller. When the length of the fused portion is 800 μm or greater, the peak power decreased with an increase in the length of the fused portion, which is fairly consistent with the results of experiments.

As described previously, according to the structure of the present invention, pulses that have a high peak power without requiring a special anti-reflection treatment that is resistant to optical power can be obtained by fusing one end face of the rare-earth doped optical fiber to the coreless fiber.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An end face structure of an optical fiber, comprising:
   a coreless fiber fused to an emitting end face of the optical fiber; and
   a coating material disposed at least around the coreless fiber, wherein a refractive index of the coating material is higher than a refractive index of the coreless fiber;
   wherein a length of the coreless fiber is selected so that light that is emitted from the optical fiber and that propagates within the coreless fiber is emitted from the coreless fiber without the light reaching a boundary between the coreless fiber and the coating material; and
   a spot diameter of reflected light which is incident to a core of the optical fiber and which is fed back to the end face of the optical fiber is $a^2/r^2$ times of the core diameter before emitting from the end face, where a is the core diameter of the optical fiber and r is the spot diameter of the emitting end face.

2. The end face structure of an optical fiber, according to claim 1, wherein the optical fiber and the coreless fiber are made of the same material.

3. The end face structure of an optical fiber, according to claim 2, wherein the optical fiber and the coreless fiber are each selected from the group consisting of a silica-based optical fiber and a fluoride-based optical fiber.

4. The end face structure of an optical fiber, according to claim 1, wherein the coating material is a resin selected from the group consisting of an ultraviolet curing resin and a thermal curing resin.

5. The end face structure of an optical fiber, according to claim 4, wherein the coating material has an optical attenuation factor of 50% or more at a wavelength of the emission light.

6. The end face structure of an optical fiber, according to claim 1, wherein the optical fiber is a rare-earth doped optical fiber.

7. The end face structure of an optical fiber according to claim 6, wherein the rare-earth doped optical fiber has a double cladding structure having first and second claddings.

8. The end face structure of an optical fiber according to claim 6, wherein at least one element doped into the rare-earth doped optical fiber is an element selected from the group consisting of Er, Yb, Ho, Tm, and Nd.

9. An optical fiber laser comprising the end face structure of an optical fiber according to claim 8.

10. The optical fiber laser according to claim 9, wherein the optical fiber laser outputs pulsed light.

11. A laser processing apparatus comprising the optical fiber laser according to claim 9.

12. The end face structure of an optical fiber according to claim 3, wherein at least one ion of an element doped into the rare-earth doped optical fiber is an ion selected from the group consisting of $Er^{3+}$, $Yb^{3+}$, $Ho^{3+}$, $Tm^{3+}$, and $Nd^{3+}$.

13. The end face structure of an optical fiber according to claim 8, wherein the element doped into the rare-earth doped optical fiber is Er.

14. The end face structure of an optical fiber, according to claim 1, wherein the coreless fiber contains substantially no air bubbles.

15. The end face structure of an optical fiber, according to claim 1, wherein the coating material is roughly polished.

16. The end face structure of an optical fiber according to claim 7, wherein the second cladding is a polymer cladding.

17. The end face structure of an optical fiber according to claim 13, wherein the refractive index of the core of the Er doped optical fiber is 1.53.

18. The end face structure of an optical fiber according to claim 1, wherein a peak power of the optical fiber is obtained when the length of the fused portion of the optical fiber is between about 0.5 mm and 0.8 mm.

19. The end face structure of an optical fiber, according to claim 1, wherein the coating material is disposed around the coreless fiber and the optical fiber.

20. The optical fiber laser according to claim 9, wherein the optical fiber laser comprises a pumping light source, a condenser lens, a rear mirror, the rare-earth doped optical fiber, the coreless fiber, a collimating lens, an acousto-optic device and an output mirror, wherein the pumping light is absorbed in the rare-earth doped optical fiber by the rare-earth ions which spontaneously emit light that has a different wavelength than that of the pumping light.

21. An optical fiber laser comprising a pumping light source, a condenser lens, a rear minor, a collimating lens, an acousto-optic device, an output minor, and an end face structure of an optical fiber,
wherein the end face structure of the optical fiber comprises:
a coreless fiber fused to an emitting end face of the optical fiber; and
a coating material disposed at least around the coreless fiber;
a refractive index of the coating material is higher than a refractive index of the coreless fiber;
the optical fiber is a rare-earth doped optical fiber;
at least one element doped into the rare-earth doped optical fiber is an element selected from the group consisting of Er, Yb, Ho, Tm, and Nd; and
the pumping light is absorbed in the rare-earth doped optical fiber by the rare-earth ions which spontaneously emit light that has a different wavelength than that of the pumping light.

22. The optical fiber laser according to claim 21, wherein a length of the coreless fiber is selected so that light that is emitted from the optical fiber and that propagates within the coreless fiber is emitted from the coreless fiber without the light reaching a boundary between the coreless fiber and the coating material.

23. The optical fiber laser according to claim 22, wherein the optical fiber and the coreless fiber are made of the same material.

24. The optical fiber laser according to claim 23, wherein the optical fiber and the coreless fiber are each selected from the group consisting of a silica-based optical fiber and a fluoride-based optical fiber.

25. The optical fiber laser according to claim 22, wherein the coating material is a resin selected from the group consisting of an ultraviolet curing resin and a thermal curing resin.

26. The optical fiber laser according to claim 25, wherein the coating material has an optical attenuation factor of 50% or more at a wavelength of the emission light.

27. The optical fiber laser according to claim 21, wherein the rare-earth doped optical fiber has a double cladding structure having first and second claddings.

28. The optical fiber laser according to claim 21, wherein the optical fiber laser outputs pulsed light.

29. A laser processing apparatus comprising the optical fiber laser according to claim 21.

30. The optical fiber laser according to claim 24, wherein at least one ion of an element doped into the rare-earth doped optical fiber is an ion selected from the group consisting of $Er^{3+}$, $Yb^{3+}$, $Ho^{3+}$, $Tm^{3+}$, and $Nd^{3+}$.

31. The optical fiber laser according to claim 21, wherein the element doped into the rare-earth doped optical fiber is Er.

32. The optical fiber laser according to claim 21, wherein the coreless fiber contains substantially no air bubbles.

33. The optical fiber laser according to claim 21, wherein the coating material is roughly polished.

34. The optical fiber laser according to claim 27, wherein the second cladding is a polymer cladding.

35. The optical fiber laser according to claim 31, wherein the refractive index of the core of the Er doped optical fiber is 1.53.

36. The optical fiber laser according to claim 21, wherein a peak power of the optical fiber is obtained when the length of the fused portion of the optical fiber is between about 0.5 mm and 0.8 mm.

37. The optical fiber laser according to claim 21, wherein the coating material is disposed around the coreless fiber and the optical fiber.

* * * * *